US009218644B2

(12) United States Patent
Kellerman et al.

(10) Patent No.: US 9,218,644 B2
(45) Date of Patent: Dec. 22, 2015

(54) METHOD AND SYSTEM FOR ENHANCED 2D VIDEO DISPLAY BASED ON 3D VIDEO INPUT

(75) Inventors: Marcus Kellerman, San Diego, CA (US); Xuemin Chen, Rancho Sante Fe, CA (US); Samir Hulyalkar, Newtown, PA (US); Ilya Klebanov, Thornhill (CA)

(73) Assignee: BROADCOM CORPORATION, Irvine, CA (US)

( * ) Notice: Subject to any disclaimer, the term of this patent is extended or adjusted under 35 U.S.C. 154(b) by 645 days.

(21) Appl. No.: 12/689,356

(22) Filed: Jan. 19, 2010

(65) Prior Publication Data
US 2011/0149019 A1    Jun. 23, 2011

Related U.S. Application Data

(60) Provisional application No. 61/287,624, filed on Dec. 17, 2009, provisional application No. 61/287,634, filed on Dec. 17, 2009, provisional application No. 61/287,653, filed on Dec. 17, 2009, provisional (Continued)

(51) Int. Cl.
*G06T 3/40* (2006.01)

(52) U.S. Cl.
CPC ..... *G06T 3/4007* (2013.01); *G06T 2207/10021* (2013.01)

(58) Field of Classification Search
CPC .................... G06T 3/4007; G06T 2207/10021
USPC .......................................................... 348/42
See application file for complete search history.

(56) References Cited

U.S. PATENT DOCUMENTS

| 6,059,727 | A  | * | 5/2000  | Fowlkes et al. ............... 600/443 |
| 6,148,113 | A  | * | 11/2000 | Wolverton et al. ........... 382/255 |
| 7,079,174 | B2 | * | 7/2006  | Taniguchi et al. ............. 348/51 |
| 7,254,265 | B2 | * | 8/2007  | Naske et al. .................. 382/154 |

(Continued)

FOREIGN PATENT DOCUMENTS

| CN | 1395231 A | 2/2003 |
| CN | 1496177 A | 5/2004 |

(Continued)

OTHER PUBLICATIONS

Office Action from related CN application 201010593937.6 mailed Jan. 30, 2013.

(Continued)

*Primary Examiner* — Behrooz Senfi
*Assistant Examiner* — Maria Vazquez Colon
(74) *Attorney, Agent, or Firm* — Foley & Lardner LLP (57) ABSTRACT

A video processing device may generate a two dimensional (2D) output video stream from a three dimensional (3D) input video stream that comprises a plurality of view sequences. The plurality of view sequences may comprise sequences of stereoscopic left and right reference fields or frames. A view sequence may initially be selected as a base sequence for the 2D output video stream, and the 2D output video stream may be enhanced using video content and/or information from unselected view sequences. The video content and/or information utilized in enhancing the 2D output video stream may comprise depth information, and/or foreground and/or background information. The enhancement of the 2D input video stream may comprise improving depth, contrast, sharpness, and/or rate upconversion using frame and/or field based interpolation of images in the 2D output video stream.

21 Claims, 5 Drawing Sheets

Related U.S. Application Data application No. 61/287,668, filed on Dec. 17, 2009, provisional application No. 61/287,673, filed on Dec. 17, 2009, provisional application No. 61/287,682, filed on Dec. 17, 2009, provisional application No. 61/287,692, filed on Dec. 17, 2009.

(56) References Cited

U.S. PATENT DOCUMENTS

| | | | |
|---|---|---|---|
| 7,529,401 B2* | 5/2009 | Kagitani | 382/154 |
| 7,580,463 B2 | 8/2009 | Routhier et al. | |
| 7,693,221 B2* | 4/2010 | Routhier et al. | 375/240.26 |
| 8,116,369 B2* | 2/2012 | Choi et al. | 375/240.01 |
| 8,260,950 B1* | 9/2012 | Bertz et al. | 709/231 |
| 2003/0091112 A1* | 5/2003 | Chen | 375/240.15 |
| 2005/0062846 A1* | 3/2005 | Choi et al. | 348/42 |
| 2005/0117637 A1 | 6/2005 | Routhier et al. | |
| 2006/0013472 A1 | 1/2006 | Kagitani | |
| 2008/0085049 A1 | 4/2008 | Naske et al. | |
| 2009/0202227 A1* | 8/2009 | Jang et al. | 386/108 |
| 2010/0091091 A1* | 4/2010 | Kim | 348/42 |
| 2011/0109723 A1* | 5/2011 | Ashbey | 348/44 |
| 2011/0280300 A1* | 11/2011 | Tourapis et al. | 375/240.2 |
| 2012/0027079 A1* | 2/2012 | Ye et al. | 375/240.02 |

FOREIGN PATENT DOCUMENTS

| | | |
|---|---|---|
| CN | 100442859 C | 12/2008 |
| EP | 1 406 163 | 4/2004 |
| WO | WO-03/056843 | 7/2003 |

OTHER PUBLICATIONS

English Abstract of CN1395231, filed Feb. 5, 2003.
Extended European Search Report for EP Application No. 10015573.8, dated Feb. 11, 2015, 9 pages.
Office Action for Taiwanese Patent Application No. 99144389, dated Dec. 24, 2014, 6 pages.
Office Action for Chinese Patent Application No. 201010593937.6, dated Jun. 25, 2015, 8 pages.

* cited by examiner

METHOD AND SYSTEM FOR ENHANCED 2D VIDEO DISPLAY BASED ON 3D VIDEO INPUT

CROSS-REFERENCE TO RELATED APPLICATIONS/INCORPORATION BY REFERENCE

This patent application makes reference to, claims priority to and claims benefit from U.S. Provisional Application Ser. No. 61/287,624 which was filed on Dec. 17, 2009. This application makes reference to:
U.S. Provisional Application Ser. No. 61/287,624 which was filed on Dec. 17, 2009;
U.S. Provisional Application Ser. No. 61/287,634 which was filed on Dec. 17, 2009;
U.S. application Ser. No. 12/554,416 which was filed on Sep. 4, 2009;
U.S. application Ser. No. 12/546,644 which was filed on Aug. 24, 2009;
U.S. application Ser. No. 12/619,461 which was filed on Nov. 6, 2009;
U.S. application Ser. No. 12/578,048 which was filed on Oct. 13, 2009;
U.S. Provisional Application Ser. No. 61/287,653 which was filed on Dec. 17, 2009;
U.S. application Ser. No. 12/604,980 which was filed on Oct. 23, 2009;
U.S. application Ser. No. 12/545,679 which was filed on Aug. 21, 2009;
U.S. application Ser. No. 12/560,554 which was filed on Sep. 16, 2009;
U.S. application Ser. No. 12/560,578 which was filed on Sep. 16, 2009;
U.S. application Ser. No. 12/560,592 which was filed on Sep. 16, 2009;
U.S. application Ser. No. 12/604,936 which was filed on Oct. 23, 2009;
U.S. Provisional Application Ser. No. 61/287,668 which was filed on Dec. 17, 2009;
U.S. application Ser. No. 12/573,746 which was filed on Oct. 5, 2009;
U.S. application Ser. No. 12/573,771 which was filed on Oct. 5, 2009;
U.S. Provisional Application Ser. No. 61/287,673 which was filed on Dec. 17, 2009;
U.S. Provisional Application Ser. No. 61/287,682 which was filed on Dec. 17, 2009;
U.S. application Ser. No. 12/605,039 which was filed on Oct. 23, 2009; and
U.S. Provisional Application Ser. No. 61/287,692 which was filed on Dec. 17, 2009.

Each of the above stated applications is hereby incorporated herein by reference in its entirety

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to video processing. More specifically, certain embodiments of the invention relate to a method and system for enhanced 2D video display based on 3D video input.

BACKGROUND OF THE INVENTION

Display devices, such as television sets (TVs), may be utilized to output or playback audiovisual or multimedia streams, which may comprise TV broadcasts, telecasts and/or localized Audio/Video (A/V) feeds from one or more available consumer devices, such as videocassette recorders (VCRs) and/or Digital Video Disc (DVD) players. TV broadcasts and/or audiovisual or multimedia feeds may be inputted directly into the TVs, or it may be passed intermediately via one or more specialized set-top boxes that may enable providing any necessary processing operations. Exemplary types of connectors that may be used to input data into TVs include, but not limited to, F-connectors, S-video, composite and/or video component connectors, and/or, more recently, High-Definition Multimedia Interface (HDMI) connectors.

Television broadcasts are generally transmitted by television head-ends over broadcast channels, via RF carriers or wired connections. TV head-ends may comprise terrestrial TV head-ends, Cable-Television (CATV), satellite TV head-ends and/or broadband television head-ends. Terrestrial TV head-ends may utilize, for example, a set of terrestrial broadcast channels, which in the U.S. may comprise, for example, channels 2 through 69. Cable-Television (CATV) broadcasts may utilize even greater number of broadcast channels. TV broadcasts comprise transmission of video and/or audio information, wherein the video and/or audio information may be encoded into the broadcast channels via one of plurality of available modulation schemes. TV Broadcasts may utilize analog and/or digital modulation format. In analog television systems, picture and sound information are encoded into, and transmitted via analog signals, wherein the video/audio information may be conveyed via broadcast signals, via amplitude and/or frequency modulation on the television signal, based on analog television encoding standard. Analog television broadcasters may, for example, encode their signals using NTSC, PAL and/or SECAM analog encoding and then modulate these signals onto a VHF or UHF RF carriers, for example.

In digital television (DTV) systems, television broadcasts may be communicated by terrestrial, cable and/or satellite head-ends via discrete (digital) signals, utilizing one of available digital modulation schemes, which may comprise, for example, QAM, VSB, QPSK and/or OFDM. Because the use of digital signals generally requires less bandwidth than analog signals to convey the same information, DTV systems may enable broadcasters to provide more digital channels within the same space otherwise available to analog television systems. In addition, use of digital television signals may enable broadcasters to provide high-definition television (HDTV) broadcasting and/or to provide other non-television related service via the digital system. Available digital television systems comprise, for example, ATSC, DVB, DMB-T/H and/or ISDN based systems. Video and/or audio information may be encoded into digital television signals utilizing various video and/or audio encoding and/or compression algorithms, which may comprise, for example, MPEG-1/2, MPEG-4 AVC, MP3, AC-3, AAC and/or HE-AAC.

Nowadays most TV broadcasts (and similar multimedia feeds), utilize video formatting standard that enable communication of video images in the form of bit streams. These video standards may utilize various interpolation and/or rate conversion functions to present content comprising still and/ or moving images on display devices. For example, de-interlacing functions may be utilized to convert moving and/or still images to a format that is suitable for certain types of display devices that are unable to handle interlaced content. TV broadcasts, and similar video feeds, may be interlaced or progressive. Interlaced video comprises fields, each of which may be captured at a distinct time interval. A frame may comprise a pair of fields, for example, a top field and a bottom field. The pictures forming the video may comprise a plurality of ordered lines. During one of the time intervals, video content for the even-numbered lines may be captured. During a subsequent time interval, video content for the odd-numbered lines may be captured. The even-numbered lines may be collectively referred to as the top field, while the odd-numbered lines may be collectively referred to as the bottom field. Alternatively, the odd-numbered lines may be collectively referred to as the top field, while the even-numbered lines may be collectively referred to as the bottom field. In the case of progressive video frames, all the lines of the frame may be captured or played in sequence during one time interval. Interlaced video may comprise fields that were converted from progressive frames. For example, a progressive frame may be converted into two interlaced fields by organizing the even numbered lines into one field and the odd numbered lines into another field.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for enhanced 2D video display based on 3D video input, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for enhanced 2D video display based on 3D video input. In various embodiments of the invention, a video processing device may be utilized to extract a plurality of view sequences from a compressed three-dimension (3D) input video stream, and may generate a corresponding two dimensional (2D) output video stream based on the plurality of extracted view sequences. The plurality of view sequences may comprise sequences of stereoscopic left and right reference fields or frames. Video data for the 2D output video stream may be generated utilizing video content and/or information derived from one or more of the plurality of extracted view sequences. A view sequence, for example a left view sequence, may be selected as a base sequence for the 2D output video stream, and the 2D output video stream may then be enhanced using video content and/or information from unselected view sequences. The video content and/or information utilized in enhancing the 2D output video stream may comprise depth information, and/or foreground and/or background information. The enhancement of the 2D output video stream may comprise improving depth, contrast and/or sharpness of images in the 2D output video stream, and/or removing visual artifacts. In instances where the display frame rate may be higher than the frame rate of the received 3D input video stream, the video processing device may perform frame upconversion operations on the 2D output video stream, for example using frame or field interpolation. Such frame and/or field interpolations may then be modified, to enhance the quality of the 2D output video stream, using video content and/or information in frames and/or fields in one or more of the plurality of extracted view sequences that may not initially be selected as base sequence for the 2D output video stream. The video processing device may also be utilized to locally perform graphic processing corresponding to the 2D output video stream. The local graphics processing may be performed based on, for example, one or more points of focus within each image in the 2D output video stream.

Figure 1:
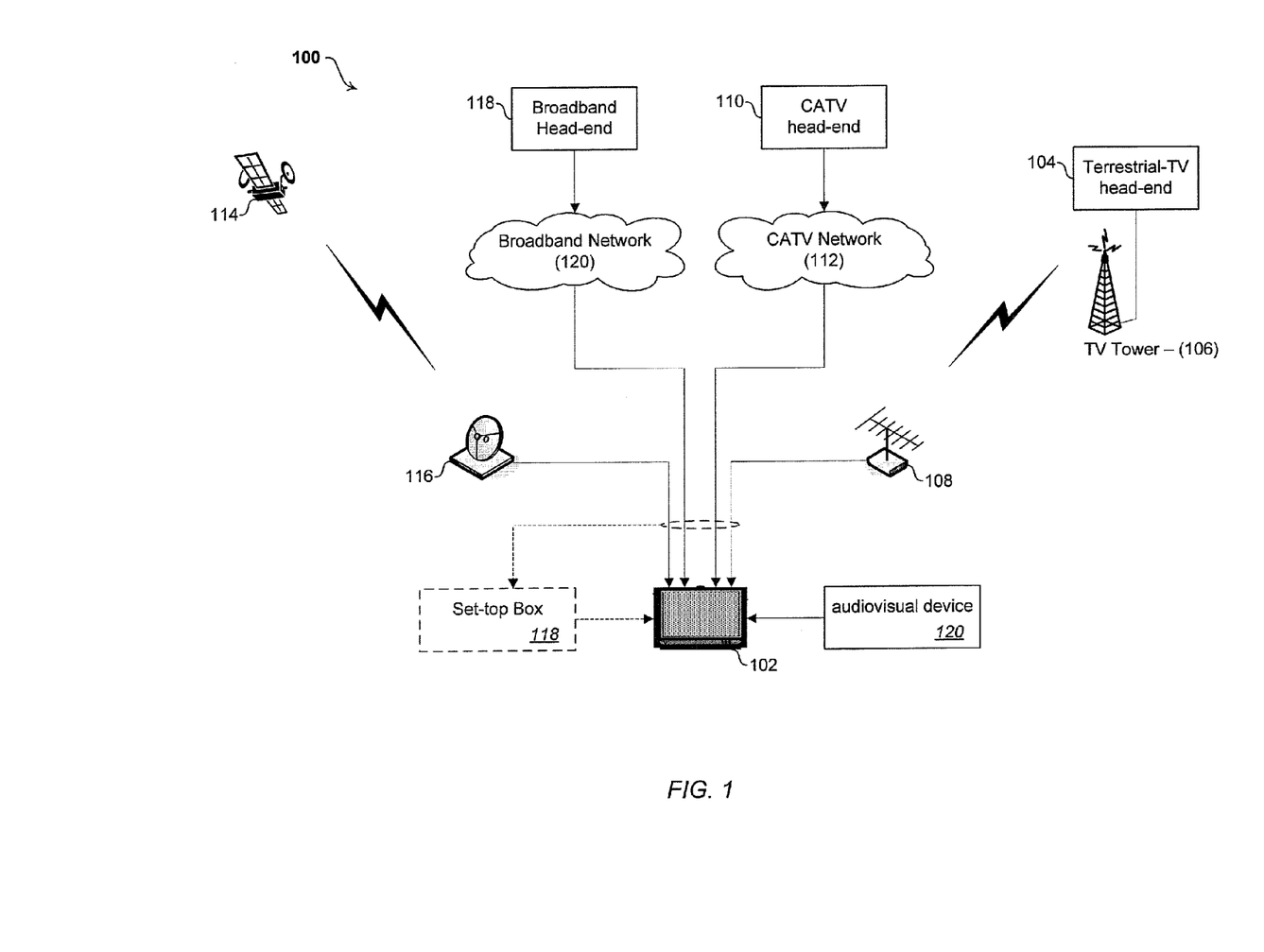
FIG. 1 is a block diagram illustrating an exemplary video system that may be operable to playback various TV broadcasts and/or media feeds received from local devices, in accordance with an embodiment of the invention.

FIG. 1 is a block diagram illustrating a video system that may be operable to playback various TV broadcasts and/or media feeds received from local devices, in accordance with an embodiment of the invention. Referring to FIG. 1, there is shown a media system 100 which may comprise a display device 102, a terrestrial-TV head-end 104, a TV tower 106, a TV antenna 108, a cable-TV (CATV) head-end 110, a cable-TV (CATV) distribution network 112, a satellite-TV head-end 114, a satellite-TV receiver 116, a broadband TV head-end 118, a broadband network 120, a set-top box 122, and an audio-visual (AV) player device 124.

The display device 102 may comprise suitable logic, circuitry, interfaces and/or code that enable playing of multimedia streams, which may comprise audio-visual (AV) data. The display device 102 may comprise, for example, a television, a monitor, and/or other display and/or audio playback devices, and/or components that may be operable to playback video streams and/or corresponding audio data, which may be received, directly by the display device 102 and/or indirectly via intermediate devices, such as the set-top box 122, and/or from local media recording/playing devices and/or storage resources, such as the AV player device 124.

The terrestrial-TV head-end 104 may comprise suitable logic, circuitry, interfaces and/or code that may enable over-the-air broadcast of TV signals, via one or more of the TV tower 106. The terrestrial-TV head-end 104 may be enabled to broadcast analog and/or digital encoded terrestrial TV signals. The TV antenna 108 may comprise suitable logic, circuitry, interfaces and/or code that may enable reception of TV signals transmitted by the terrestrial-TV head-end 104, via the TV tower 106. The CATV head-end 110 may comprise suitable logic, circuitry, interfaces and/or code that may enable communication of cable-TV signals. The CATV head-end 110 may be enabled to broadcast analog and/or digital formatted cable-TV signals. The CATV distribution network 112 may comprise suitable distribution systems that may enable forwarding of communication from the CATV head-end 110 to a plurality of cable-TV recipients, comprising, for example, the display device 102. For example, the CATV distribution network 112 may comprise a network of fiber optics and/or coaxial cables that enable connectivity between one or more instances of the CATV head-end 110 and the display device 102.

The satellite-TV head-end 114 may comprise suitable logic, circuitry, interfaces and/or code that may enable down link communication of satellite-TV signals to terrestrial recipients, such as the display device 102. The satellite-TV head-end 114 may comprise, for example, one of a plurality of orbiting satellite nodes in a satellite-N system. The satellite-TV receiver 116 may comprise suitable logic, circuitry, interfaces and/or code that may enable reception of downlink satellite-TV signals transmitted by the satellite-TV head-end 114. For example, the satellite receiver 116 may comprise a dedicated parabolic antenna operable to receive satellite television signals communicated from satellite television head-ends, and to reflect and/or concentrate the received satellite signal into focal point wherein one or more low-noise-amplifiers (LNAs) may be utilized to down-convert the received signals to corresponding intermediate frequencies that may be further processed to enable extraction of audio/video data, via the set-top box 122 for example. Additionally, because most satellite-TV downlink feeds may be securely encoded and/or scrambled, the satellite-TV receiver 116 may also comprise suitable logic, circuitry, interfaces and/or code that may enable decoding, descrambling, and/or deciphering of received satellite-TV feeds.

The broadband TV head-end 118 may comprise suitable logic, circuitry, interfaces and/or code that may enable multimedia/TV broadcasts via the broadband network 120. The broadband network 120 may comprise a system of interconnected networks, which enables exchange of information and/or data among a plurality of nodes, based on one or more networking standards, including, for example, TCP/IP. The broadband network 120 may comprise a plurality of broadband capable sub-networks, which may include, for example, satellite networks, cable networks, DVB networks, the Internet, and/or similar local or wide area networks, that collectively enable conveying data that may comprise multimedia content to plurality of end users. Connectivity may be provided via the broadband network 120 based on copper-based and/or fiber-optic wired connection, wireless interfaces, and/or other standards-based interfaces. The broadband TV head-end 118 and the broadband network 120 may correspond to, for example, an Internet Protocol Television (IPTV) system.

The set-top box 122 may comprise suitable logic, circuitry, interfaces and/or code that may enable processing of TV and/or multimedia streams/signals transmitted by one or more TV head-ends external to the display device 102. The AV player device 124 may comprise suitable logic, circuitry, interfaces and/or code that enable providing video/audio feeds to the display device 102. For example, the AV player device 124 may comprise a digital video disc (DVD) player, a Blu-ray player, a digital video recorder (DVR), a video game console, a surveillance system, and/or a personal computer (PC) capture/playback card. While the set-top box 122 and the AV player device 124 are shown as separate entities, at least some of the functions performed via the top box 122 and/or the AV player device 124 may be integrated directly into the display device 102.

In operation, the display device 102 may be utilized to playback media streams received from one of available broadcast head-ends, and/or from one or more local sources. The display device 102 may receive, for example, via the TV antenna 108, over-the-air TV broadcasts from the terrestrial-TV head end 104 transmitted via the TV tower 106. The display device 102 may also receive cable-TV broadcasts, which may be communicated by the CATV head-end 110 via the CATV distribution network 112; satellite TV broadcasts, which may be communicated by the satellite head-end 114 and received via the satellite receiver 116; and/or Internet media broadcasts, which may be communicated by the broadband TV head-end 118 via the broadband network 120.

TV head-ends may utilize various encoding schemes in TV broadcasts. Historically, TV broadcasts have utilized analog modulation format schemes, comprising, for example, NTSC, PAL, and/or SECAM. Audio encoding may comprise utilization of separate modulation scheme, comprising, for example, BTSC, NICAM, mono FM, and/or AM. More recently, however, there has been a steady move towards Digital TV (DTV) based broadcasting, where digital modulation format schemes, comprising, for example, QAM, VSB, or OFDM, may be utilized for TV broadcasts to enable transmission and/or reception of video and/or audio streams as discrete signals. For example, the terrestrial-TV head-end 104 may be enabled to utilize ATSC and/or DVB based standards to facilitate DTV terrestrial broadcasts. Similarly, the CATV head-end 110 and/or the satellite head-end 114 may also be enabled to utilize appropriate encoding standards to facilitate cable and/or satellite based broadcasts.

The display device 102 may be operable to directly process multimedia/TV broadcasts to enable playing of corresponding video and/or audio data. Alternatively, an external device, for example the set-top box 122, may be utilized to perform processing operations and/or functions, which may be operable to extract video and/or audio data from received media streams, and the extracted audio/video data may then be played back via the display device 102.

In exemplary aspect of the invention, the media system 100 may support three-dimensional (3D) video. Various methods may be utilized to capture and generate (at playtime) 3D video. For example, stereoscopic video 3D video may be generated by rendering a plurality of views; typically a left view and a right view corresponding to the viewer's left eye and right eye. Accordingly, a left view video and right view video are captured and/or processed to enable creating 3D impressions. 3D video frames may then be produced by combining left view video components and right view video components, respectively. In this regard, one or more of the TV head-ends may be operable to communicate 3D video content to the display device 102. The AV player device 124 may also be operable to play previously recorded and/or generated 3D video content, from media storage element that may be read via the AV player device 124 for example. The display device 102 may then generate 3D video by processing and/or combining, for example, left view video components and right view video components, respectively.

In some instances, however, the display device 102 may only be operable to display 2D video. Accordingly, the display device 102 may be operable to generate 2D video output based on 3D video input. Furthermore, the display device 102 may be operable to enhance the generated 2D video output based on the 3D video input, utilizing, for example, content and/or information that would otherwise be utilized to generate 3D video frames and/or fields. For example, while the 2D video output may be generated only based on left view video content, the right view content may be utilized to enhance depth, contrast and/or sharpness of corresponding 2D video frames and/or fields.

Figure 2A:
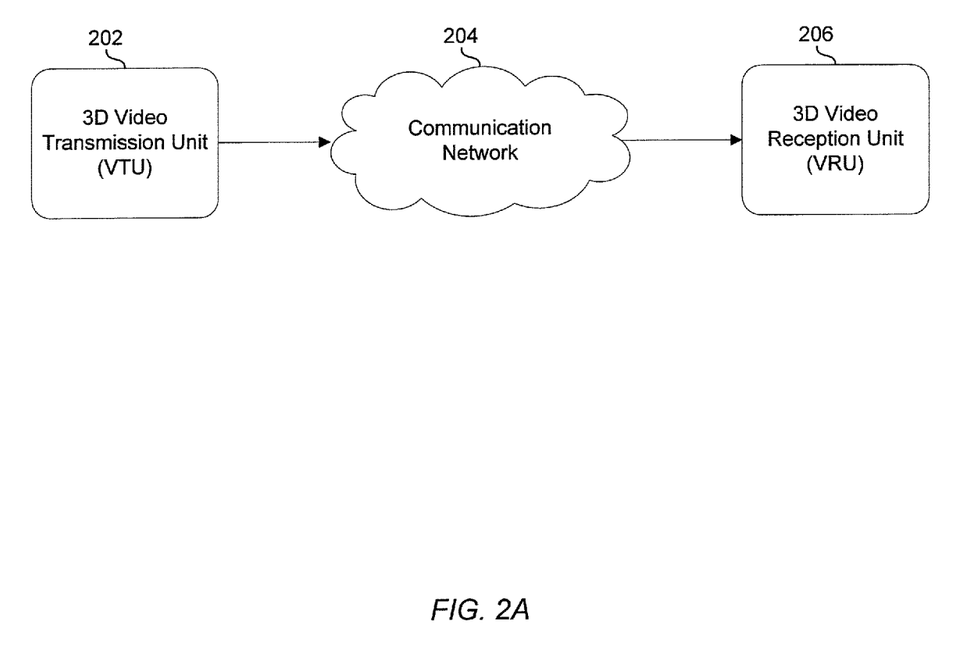
FIG. 2A is a block diagram illustrating an exemplary video system that is operable to provide communication of 3D video, which may be utilized to generate enhanced 2D video output for 2D capable display devices, in accordance with an embodiment of the invention.

FIG. 2A is a block diagram illustrating an exemplary video system that is operable to provide communication of 3D video, which may be utilized to generate enhanced 2D video output for 2D capable display devices, in accordance with an embodiment of the invention. Referring to FIG. 2A, there is shown a 3D video transmission unit (3D-VTU) 202, a communication network 204, and a video reception unit (3D-VRU) 206.

The 3D-VTU 202 may comprise suitable logic, circuitry, interfaces and/or code that may be operable to generate transport streams comprising encoded video content, which may be communicated via the communication network 204, for example, to the 3D-VRU 206. The 3D-VTU 202 may be operable to encode 3D video contents as well as 2D video contents corresponding, for example, to TV broadcasts. In this regard, the 3D-VTU 202 may correspond to, for example, the terrestrial head-end 104, the CATV head-end 110, the satellite head-end 114, and/or the broadband head-end 118 of FIG. 1. In instances where a 3D video may be encoded, the 3D-VTU 202 may be operable to encode, for example, the 3D video as a left view video stream and a right view video stream, of which each may be transmitted in a different channel to the 3D-VRU 206. Transport streams communicated via the 3D-VTU 202 may comprise additional video content, in addition to the primary video content. Exemplary additional video content may comprise news updates and/or advertisement information. In this regard, the 3D-VTU 202 may be operable to insert, via splicing for example, targeted advertisement information into contents of an entertainment program such as, for example, a 3D TV program. The 3D-VTU 202 may be operable to generate advertising streams for the targeted advertisement information. The generated advertising streams may be multiplexed with encoded 3D video streams of the 3D TV program to form a transport stream for transmission. The advertising streams may be 3D or 2D advertising streams.

The communication network 204 may comprise suitable logic, circuitry, interfaces and/or code that may enable communication between the 3D-VTU 202 and the 3D-VRU 206, to facilitate communication of transport streams comprising 3D video content. The communication network 204 may be implemented as a wired or wireless communication network. The communication network 204 may correspond to, for example, the CAN distribution network 112 and/or the broadband network 122 of FIG. 1.

The 3D-VRU 206 may comprise suitable logic, circuitry, interfaces and/or code that may be operable to receive and process transport streams comprising video content, communicated, for example, via the 3D-VTU 202 over the communication network 204. The functionality of 3D-VRU 206 may correspond, for example, to the display device 102 and/or the set-top box 122 of FIG. 1. The received transport stream may comprise encoded 3D video content corresponding to, for example, entertainment programs included in a 3D TV broadcast. The received transport stream may also comprise additional video content, such as, for example, advertising streams of commercials. The 3D-VRU 206 may be operable to process the received transport stream to separate and/or extract various video contents in the transport stream, and may be operable to decode and/or process the extracted video streams and/or contents to facilitate display operations.

In operation, the 3D-VTU 202 may be operable to generate transport streams comprising 3D video contents corresponding to, for example, entertainment programs included in 3D TV programs. The 3D-VTU 202 may encode the 3D video content as a left view video stream and a right view video stream. Additional video content, which may comprise advertisement information for example, may be inserted into the transport stream along with the encoded 3D video contents of the 3D TV program for transmission. The transport stream may be communicated to the 3D-VRU 206 over the communication network 204. The 3D-VRU 206 may be operable to receive and process the transport stream to facilitate playback of video content included in the transport stream via display devices. In this regard, the 3D-VRU 206 may be operable to, for example, demultiplex the received transport stream into encoded 3D video streams of the 3D TV program and additional video streams. The 3D-VRU 206 may be operable to decode the encoded 3D video streams of the 3D TV program for display. Advertising streams may be extracted based on, for example, user profile and/or device configuration, from the encoded 3D video streams. Depending on device configuration and/or user preferences, the extracted advertising streams may be presented within the 3D TV program or removed for display separately. The 3D-VRU 206 may also be operable to locally process graphics corresponding to displayed video content, to produce corresponding targeted graphic objects. The targeted graphic objects may be located, for example, according to timing information indicated in associated 3D scene graph. The 3D-VRU 206 may be operable to splice the targeted graphic objects into the decoded 3D video based on the focal point of view.

In an exemplary aspect of the invention, the 3D-VRU 206 may be utilized to generate enhanced 2D video based on 3D input video. In instances where a 3D capable display device is utilized, the resulting compound 3D video may be played as 3D video via the display devices. In some instances, however, only 2D capable display devices are utilized. Accordingly, the resulting compound 3D video may be converted, via the 3D-VRU 206 for example, into a 2D video for display. The quality of 2D video generated via the 3D-VRU 206 may be enhanced based on, for example, 3D video data and/or content extracted from the received transport stream. In this regard, the 3D-VRU 206 may be operable to generate 2D video output based on 3D video input received from the 3D-VTU 202. The 2D video output may correspond to, for example, the left view video components of the 3D video input. The generated 2D video output may be enhanced, however, using data and/or information that may be derived from additional components in the 3D video input. For example, depth information, which may be determined via the 3D-VRU 206 during processing of 3D video inputs, may be utilized to improve contrast and/or depth perception in the generated 2D video output. The depth information may be derived from, for example, a depth map that corresponds to each video frame, which may be generated based on left view and right view video components corresponding to the video frame. Furthermore, processing received 3D video inputs may enable determining foreground and/or background regions in each 3D video frame. Consequently, the foreground and/or background information may be utilized to improve, for example, sharpness in corresponding output 2D video frames by applying, for example, varying selective sharpening criteria and/or parameters to different regions in the generated 2D output frame based on knowledge of foreground and/or background classification of the region. The foreground and/or background information may also be utilized to remedy and/or reduce other visual effects, such as, for example, halo effects which may be introduced during frame rate upconversion, around areas of movement where objects in the scene may be blocked during movement by other objects within the same scene. Accordingly, because the right view may provide, for example, better information regarding objects in the background, such information may be utilized during frame interpolation to avoid any blurring that may be caused by objects that may have been in the background in the present frame but would move into the foreground in subsequent frames.

In instances where frame upconversion may be necessary during generation of 2D video output, 3D video content information may also be utilized to enhance the frame rate upconversion operations. For example, because video content may be captured at slower frame rate than the refresh rates utilized during display, generation of additional frames may be necessary when captured video content is played back. The video content may be captured at, for example, 24 or 48 frame per second (fps). Most displays, however, utilize higher frame refresh rates, such as 60, 120, or 240 Hz. Consequently, when displaying 3D video, new left and/or right fields or frames may be created via interpolation, for example, based on the decompressed left and right reference fields or frames. Accordingly, in instances where 2D video output is generated from 3D video input, the frame upconversion performed on 2D video output may be enhanced by utilizing 3D contents that may not otherwise be used in generating the 2D video output. For example, while the 2D video output may be generated based only on the left view video content, the right view video content may be used to enhance quality of interpolated new left fields or frames that are utilized within the 2D video output.

After the 2D output video is generated, upconverted, and/or enhanced, graphics may be inserted into the 2D output video to ensure that the graphics are not otherwise distorted during the enhancements and/or adjustments performed on the 2D video output stream. The 3D-VRU 206 may be operable, for example, to splice graphic objects into the enhanced 2D output video stream. The splicing of graphic objects into the enhanced 2D output video stream may be performed based on focal point of view, which may be determined, for example, based on depth, and/or foreground and/or background information.

Figure 2B:
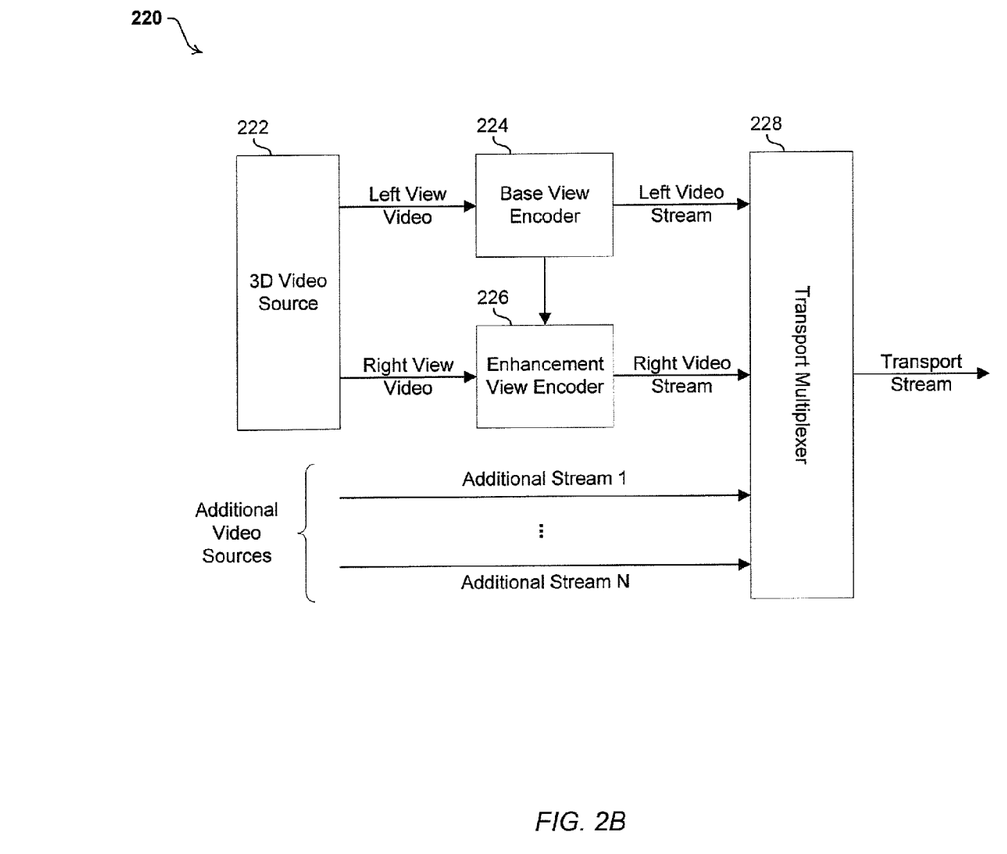
FIG. 2B is a block diagram illustrating an exemplary video processing system that is operable to generate transport streams comprising 3D encoded video, in accordance with an embodiment of the invention.

FIG. 2B is a block diagram illustrating an exemplary video processing system that is operable to generate transport streams comprising 3D encoded video, in accordance with an embodiment of the invention. Referring to FIG. 2B, there is shown a video processing system 220, a 3D video source 222, a base view encoder 224, an enhancement view encoder 226, and a transport multiplexer 228.

The video processing system 220 may comprise suitable logic, circuitry, interfaces and/or code that may be operable to capture and process 3D video data, and to generate transport streams comprising the 3D video. The video processing system 220 may comprise, for example, the 3D video source 222, the base view encoder 224, the enhancement view encoder 226, and/or the transport multiplexer 228. For example, the video processing system 220 may be integrated into the 3D-VTU 202 to facilitate generation of 3D video and/or transport streams comprising 3D video.

The 3D video source 222 may comprise suitable logic, circuitry, interfaces and/or code that may be operable to capture source 3D video contents. The 3D video source 222 may be operable to generate a left view video and a right view video from the captured source 3D video contents, to facilitate 3D video display/playback. The left view video and the right view video may be communicated to the base view encoder 224 and, for example, the enhancement view encoder 226, respectively, for video compressing.

The base view encoder 224 may comprise suitable logic, circuitry, interfaces and/or code that may be operable to encode the left view video from the 3D video source 222, for example on frame by frame basis. The base view encoder 224 may be operable to utilize various video encoding and/or compression algorithms such as specified in MPEG-2, MPEG-4, AVC, VC1, VP6, and/or other video formats to form compressed and/or encoded video contents for the left view video from the 3D video source 222. In addition, the base view encoder 224 may be operable to communication information, such as the scene information from base view coding, to the enhancement view encoder 226 to be used for enhancement view coding.

The enhancement view encoder 226 may comprise suitable logic, circuitry, interfaces and/or code that may be operable to encode the right view video from the 3D video source 222, for example on frame by frame basis. The enhancement view encoder 226 may be operable to utilize various video compression algorithms such as specified in MPEG-2, MPEG-4, AVC, VC1, VP6, and/or other video formats to form compressed or coded video content for the right view video from the 3D video source 222. Although a single enhancement view encoder 226 is illustrated in FIG. 2B, the invention may not be so limited. Accordingly, any number of enhancement view video encoders may be used for processing the left view video and the right view video generated by the 3D video source 222 without departing from the spirit and scope of various embodiments of the invention.

The transport multiplexer 228 may comprise suitable logic, circuitry, interfaces and/or code that may be operable to merge a plurality of video streams into a single compound video stream, namely a transport stream (TS), for transmission. The TS may comprise the base view stream, the enhancement view stream and a plurality of addition video streams, which may comprise, for example, advertisement streams. The additional streams may be captured directly within the video processing system 220 or alternatively may be received for dedicated sources. For example, an advertisement source may provide available advertisement video contents, via a plurality of advertising streams, which may be then spliced into the TS. In this regard, the plurality of advertising streams may be inserted into any gaps within the base video stream and/or the enhancement video stream from the base view encoder 224 and the enhancement encoder 216, respectively.

In operation, the 3D video source 222 may be operable to capture source 3D video contents to produce a left view video and a right view video for video compression. The left view video may be encoded via the base view encoder 224 producing a base view stream. The right view video may be encoded via the enhancement view encoder 226 producing an enhancement view stream. The base view encoder 224 may be operable to provide information such as the scene information to the enhancement view encoder 226 for enhancement view coding. Additionally, one or more additional video streams may be multiplexed with the base view stream and/or the enhancement view stream to form a transport stream (TS) via the transport multiplexer 228. The resulting transport stream (TS) may then be communicated, for example, to the 3D-VRU 206, substantially as described with regard to FIG. 2A.

In an exemplary aspect of the invention, some of the content encoded into the 3D video content multiplexed into the transport stream (TS) may be utilized to enable generation of enhanced 2D output video by the receiving device 3D-VRU 206. For example, where 3D video content in the TS may comprise stereoscopic left view and right view video data, the 2D display video output may be generated based on the left view video content, encoded via the base view encoder 224.

The generated 2D video output may then be enhanced using additional video data in the 3D video stream, including, for example, right view video content encoded via the enhancement view encoder 226.

Figure 2C:
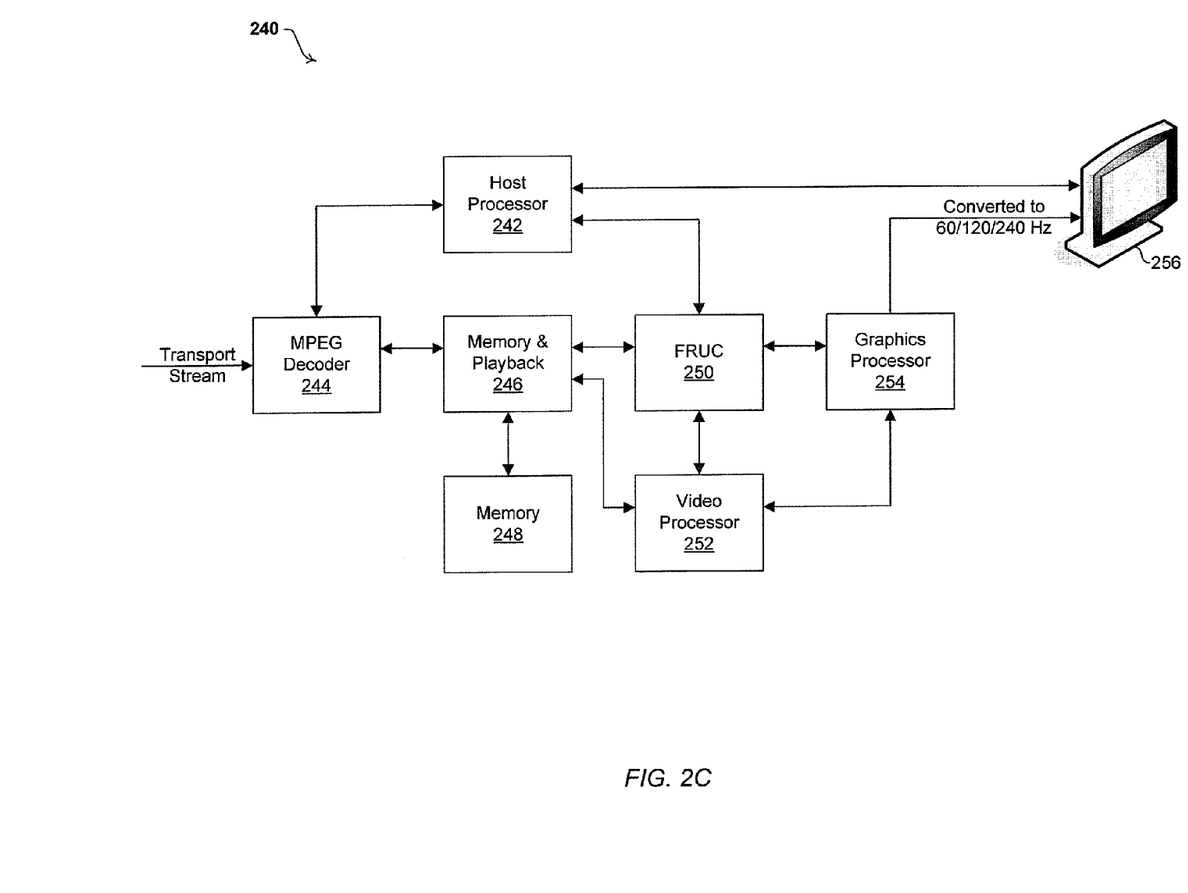
FIG. 2C is a block diagram illustrating an exemplary video processing system that is operable to generate enhanced 2D video for play via a 2D display based on 3D video input, in accordance with an embodiment of the invention.

FIG. 2C is a block diagram illustrating an exemplary video processing system that is operable to generate enhanced 2D video for play via a 2D display based on 3D video input, in accordance with an embodiment of the invention. Referring to FIG. 2C there is shown a video processing system 240, a host processor 242, an MPEG decoder 244, a memory and playback module 246, a system memory 248, a frame rate up-conversion (FRUC) module 250, a video processor 252, a graphics processor 254, and a display 256.

The video processing system 240 may comprise suitable logic, circuitry, interfaces and/or code that may be operable to receive and process 3D video data in a compressed format and may render reconstructed output video for display. The video processing system 240 may comprise, for example, the host processor 242, the MPEG decoder 244, the memory and playback module 246, the system memory 248, the FRUC module 250, the video processor 252, and/or the graphics processor 254. For example, the video processing system 240 may be integrated into the 3D-VRU 206 to facilitate reception and/or processing of transport streams comprising 3D video content communicated by the 3D-VTU 202. The video processing system 240 may be operable to handle interlaced video fields and/or progressive video frames. In this regard, the video processing system 240 may be operable to decompress and/or up-convert interlaced video and/or progressive video. The video fields, for example, interlaced fields and/or progressive video frames may be referred to as fields, video fields, frames or video frames. In an exemplary aspect of the invention, the video processing system 240 may be operable to generate enhanced 2D video output based on 3D input video.

The host processor 242 may comprise suitable logic, circuitry, interfaces and/or code that may be operable to process data and/or control operations of the video processing system 240. In this regard, the host processor 242 may be operable to provide control signals to various other portions, components, and/or subsystems of the video processing system 240. The host processor 242 may also control data transfers between various portions of the video processing system 240. The host processor 242 may enable execution of applications programs and/or code. In this regard, the applications, programs, and/or code may enable, for example, decompression, motion compensation operations, interpolation or otherwise processing 3D video data. Furthermore, the applications, programs, and/or code may enable, for example, configuring or controlling operation of the MPEG decoder and/or the FRUC module 250 for example.

The MPEG decoder 244 may comprise suitable logic, circuitry, interfaces and/or code that may be operable to demultiplex or parse received transport streams to extract streams within the received transport streams, to decompress 3D video data that may carried via the received transport streams, and/or may perform additional security operations such as digital rights management. In this regard, the 3D video data may be received as left and/or right view stereoscopic video frames. The video data may be received based on MPEG-2 transport stream (TS) protocol or MPEG-2 program stream (PS) container formats, for example. In various embodiments of the invention, the left view data and the right view data may be received in separate streams or separate files. In this instance, the MPEG decoder 244 may decompress the received separate left and right view video data based on, for example, MPEG-2 MVP, H.264 and/or MPEG-4 advanced video coding (AVC) or MPEG-4 multi-view video coding (MVC). In other embodiments of the invention, the stereoscopic left and right views may be combined into a single sequence of frames. For example, side-by-side, top-bottom and/or checkerboard lattice based 3D encoders may convert frames from a 3D stream comprising left view data and right view data into a single-compressed frame and may use MPEG-2, H.264, AVC and/or other encoding techniques. In this instance, the video data may be decompressed by the MPEG decoder 244 based on MPEG-4 AVC and/or MPEG-2 main profile (MP), for example. The MPEG decoder 244 may recreate the single-compressed frame and may processes it utilizing an appropriate decoder, for example, a decoder corresponding to the side-by-side, top-bottom or checkerboard lattice based 3D encoders. In this regard, the decoder may be chosen based on a corresponding encoding scheme that is used for compressing 3D content.

The memory and playback module 246 may comprise suitable logic, circuitry interfaces and/or code that may be operable to buffer 3D video data, for example, left and/or right views, while it is being transferred from one process and/or component to another. In this regard, the memory and playback module 246 may receive data from the MPEG decoder 244 and may transfer data to the FRUC module 250, the video processor 252, and/or the graphics processor 254. In addition, the memory and playback module 246 may buffer decompressed reference frames and/or fields, for example, during frame interpolation by the FRUC module 250 and/or enhancement of generated 2D output video stream in the video processing system 240. The memory and playback module 246 may exchange control signals with the host processor 242 for example and/or may write data to the system memory 248 for longer term storage.

The system memory 248 may comprise suitable logic, circuitry, interfaces and/or code that may operable to store information comprising parameters and/or code that may effectuate the operation of the video processing system 240. The parameters may comprise configuration data and the code may comprise operational code such as software and/or firmware, but the information need not be limited in this regard. Additionally, the system memory 248 may be operable to store 3D video data, for example, data that may comprise left and right views of stereoscopic image data.

The FRUC module 250 may comprise suitable logic, circuitry, interfaces and/or code that may be operable to receive stereoscopic video frames at one rate, for example, 24 or 48 fps, and output the frames at a higher rate, for example, at 60, 120 and/or 240 Hz. In this regard, the FRUC module 250 may interpolate one or more frames that may be inserted between the received frames to increase the number of frames per second. The FRUC module 250 may be operable to perform motion estimation and/or motion compensation in order to interpolate the frames. The FRUC module 250 may be operable to handle stereoscopic left and right views. In various embodiments of the invention, in instances where only stereoscopic view, for example the left view, is utilized to generate 2D video output streams, the FRUC module 250 may be operable utilized frames or fields of unused view to enhance interpolation operations. For example, a right view frame may comprise scene information in an area that may be covered by a moving object in a corresponding left view frame. Accordingly, specified scene information in the right field may be utilized to interpolate pixels in one or more left view frames when the area under the moving object has been uncovered.

The video processor 252 may comprise suitable logic, circuitry, interfaces and/or code that may be operable to perform video processing within the video processing system 240 to facilitate generating output video streams that may be played via the display 256. In various embodiments of the invention, the video processor 254 may be operable to generate 2D video output based on 3D video input streams. The video processor 252 may also be operable to enhance the generated 2D video output stream based on, for example, video data of the 3D video input streams. In this regard, the video processor 252 may generate the 2D video output stream based on the left view video stream where the 3D input streams comprise stereoscopic video. Enhancement of the generated 2D video may be performed using such video data as depth, and/or foreground and/or background information, substantially as described with regard to, for example, FIG. 2A.

The graphics processor 254 may comprise suitable logic, circuitry, interfaces and/or code that may be operable to perform graphic processing locally within the video processing system 240 based on, for example, the focal point of view. The graphics processor 254 may be operable to generate graphic objects that may be composited into the output video stream. The graphic objects may be generated based on, for example, the focal point of view and/or the last view of a served entertainment program. In instances where 2D video output is generated via the video processing system 240, the generated graphic objects may comprise 2D graphic objects. The splicing of graphic objects via the graphics processor 254 may be performed after the 2D video output stream is generated, enhanced, and upconverted via the video processor 252 and/or the FRUC module 250.

The display 256 may comprise suitable logic, circuitry, interfaces and/or code that may be operable to receive reconstructed fields and/or frames of video data after processing in the FRUC module 250 and may display corresponding images. The display 256 may be a separate device, or the display 256 and the video processing system 240 may implemented as single unitary device. The display 256 may be operable to perform 3D or 2D video display. In this regard, a 2D display may be operable to display video that was generated and/or processed utilizing 3D techniques.

In operation, the MPEG decoder 244 may be operable to receive transport streams comprising stereoscopic video data, in a dual view compression format for example, and to decode and/or decompress that video data. For example, the left and the right stereoscopic views may be compressed in separate sequences or may be combined into a single sequence of frames in a side by side format, an over under format and/or a checkerboard format. The host processor 242 may generate control signals to enable processing and transfer of data to the various modules in the video processing system 240. The MPEG decoder 244 may be operable to decompress the received stereoscopic video data and may buffer the decompressed data in the memory and playback module 246. The decompressed video data may then be read by the FRUC module 250 and/or the video processor 252 to enable generation of enhanced 2D video output stream based on the received 3D video input streams. In this regard, the video processor 252 may utilize, for example, the left view stream to generate the 2D video output stream, and may utilize additional video data, including, for example, the right view stream, to enhance the generated 2D video output stream, substantially as described with regard to, for example, FIG. 2A. The FRUC module 250 may be operable to perform motion compensation and/or interpolation of pixel data for one or more frames in order to provide frame rate up-conversion. The graphics processor 254 may be operable to provide local graphics processing, to enable splicing, for example, graphics into the generated and enhanced 2D video output stream, and the final 2D video output stream may then be played via the display 256.

Figure 3:
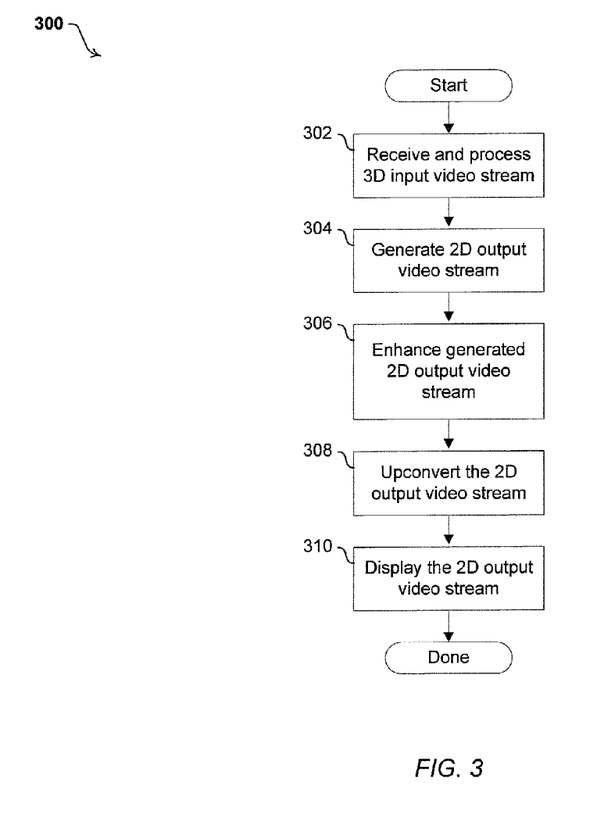
FIG. 3 is a flow chart that illustrates exemplary steps for generating enhanced 2D video output based on 3D video input, in accordance with an embodiment of the invention.

FIG. 3 is a flow chart that illustrates exemplary steps for generating enhanced 2D video output based on 3D video input, in accordance with an embodiment of the invention. Referring to FIG. 3, there is shown a flow chart 300 comprising a plurality of exemplary steps that may be performed to enable generating enhanced 2D output video from received 3D input video.

In step 302, 3D input video streams may be received and processed. For example, the video processing system 240 may be operable to receive and processing transport stream comprising 3D stereoscopic video data. In this regard, the video data may comprise left view and right view. In step 304, a 2D output video stream may be generated based on the 3D input video stream. For example, in instances where the 3D video input stream comprise the left view and the right view, the 2D video output stream may be generated based on one of the views, for example the left views. In step 306, the generated 2D output video stream may be enhanced based on, for example, the 3D video input stream. For example, in instances where the 2D video output stream is generated based on the left view stream, the generated 2D video output stream may be enhanced, to improve its quality and/or to reduce any visual artifacts based on video data corresponding to both the left view stream and the right view stream. The enhancement may be performed based on, for example, depth, and/or foreground and/or background information, which may be determined from the 3D video data, substantially as described with regard to FIG. 2A.

In step 308, the frame rate of the 2D output video stream may be upconverted to enable playback via the display devices with higher frame refresh rate than the frame capture rate. For example, most video content is captured at 24 or 48 fps while most display devices utilize 60, 120, or even 240 Hz refresh rate. Accordingly, the video stream frame rate may be upconverted to improve video quality at playback. Various methods comprising frame Interpolation may be utilized to upconvert frame rates. For frame interpolation, one or more new frames are generated based on and inserted between each two successive original frames. In instances where 2D video output stream is generated based on 3D video input stream, the frame rate upconversion operations may be enhanced by using additional video content that may not otherwise be used to generate 2D video output stream. For example, in instances where the 2D video output stream is generated based on the left view stream of 3D stereoscopic input video, the interpolated frames and/or fields, may be generated and/or enhanced using unused right view frames and/or fields. In step 310, the 2D video output stream is played back via a 2D display device.

Various embodiments of the invention may comprise a method and system for enhanced 2D video display based on 3D video input. The video processing system 240 may be utilized to receive and process three-dimension (3D) input video streams, to extract, for example, view sequences integrated within the received 3D input video streams, and may then generate corresponding two dimensional (2D) output video streams when the display 256 may only be capable of 2D playback operations. The plurality of view sequences may comprise sequences of stereoscopic left and right reference fields or frames. The 2D output video stream may be generated, via the video processor 252 for example, based on the plurality of extracted view sequences. The video processor 252 may generate video data for the 2D output video stream using video content and/or information derived from one or more of the plurality of extracted view sequences. In this regard, the video processor 252 may select a view sequence, for example a left view sequence, as a base sequence for the 2D output video stream. The video processor 252 may then enhance the 2D output video stream using video content and/or information from unselected view sequences. The video content and/or information utilized in enhancing the 2D output video stream may comprise depth information, and/or foreground and/or background information. The enhancement of the 2D output video stream may comprise improving depth, contrast and/or sharpness of images in the 2D output video stream, and/or removing visual artifacts. In instances where the display frame rate may be higher than the frame rate of the received 3D input video stream, the video processing system 240 may perform, via the FRUC module 250 for example, frame upconversion operations on the 2D output video stream, using frame or field interpolation for example. The frame and/or field interpolations may be enhanced, to further improve the quality of the 2D output video stream, using video content and/or information in frames and/or fields view sequences that may not initially be selected as base sequence for the 2D output video stream. The video processing system 240 may also be utilized to locally perform graphic processing corresponding to the 2D output video stream, via the graphics processor 254. The graphics processor 254 may perform local graphics processing based on, for example, one or more points of focus within each image in the 2D output video stream.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for enhanced 2D video display based on 3D video input.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for image processing, the method comprising:
performing by one or more processors, one or more circuits, or any combination thereof in an image processing system:
extracting a plurality of view sequences from a three-dimension (3D) input image stream, the plurality of view sequences comprising a left view sequence and a right view sequence; and
generating a two dimensional (2D) output image stream based on a base sequence of said plurality of extracted view sequences, wherein image data for said 2D output image stream is generated utilizing view information derived from said base sequence and at least one other sequence of said plurality of extracted view sequences, where said base sequence corresponds to one of said left view sequence or said right view sequence and said at least one other sequence comprises the other of said left view sequence or said right view sequence, such that:
when said base sequence corresponds to said left view sequence, said at least one other sequence comprises said right view sequence; and
when said base sequence corresponds to said right view sequence, said at least one other sequence comprises said left view sequence
wherein generating said 2D output image stream comprises:
selecting one of said left view sequence or said right view sequence as the base sequence for generating said 2D image stream; and
enhancing at least one of a contrast or a sharpness of said one of said left view sequence or said right view sequence selected as said base sequence using the other of said left view sequence or said right view sequence not selected as said base view sequence.

2. The method according to claim 1, wherein said plurality of extracted view sequences comprises sequences of stereoscopic left and right reference fields or frames.

3. The method according to claim 1, wherein said view information utilized during said generation of said image data for said 2D output image stream comprises foreground information, background information, or both.

4. The method according to claim 1, comprising classifying regions of frames of said plurality of extracted view sequences as a foreground region or a background region based at least in part upon said view information.

5. The method according to claim 4, comprising modifying images in said generated 2D output image stream based at least in part upon said region classifications.

6. The method according to claim 5, wherein said modification enhances contrast, sharpness, or both of said images in said 2D output image stream.

7. The method according to claim 1, comprising performing frame rate upconversion operations on said 2D output image stream using frame or field interpolation based upon the view information derived from said base sequence and said at least one other sequence.

8. The method according to claim 7, comprising modifying said interpolation based on the view information derived from said at least one other sequence of said plurality of extracted view sequences.

9. The method according to claim 1, comprising locally performing graphic processing corresponding to include a graphic object in a plurality of images of said 2D output image stream.

10. The method according to claim 9, comprising wherein locally performing said local graphics processing comprises splicing said graphic object into said plurality of images based on one or more points of focus within each image in said 2D output image stream of said plurality of images.

11. A system for image processing, the system comprising:
one or more circuits, one or more processors, or any combination thereof that are operable to extract a plurality of view sequences from a compressed three-dimension (3D) input image stream; and
said one or more circuits, one or more processors, or combination thereof are operable to generate a two dimensional (2D) output image stream based on a base sequence corresponding to one of a left view sequence or a right view sequence of said plurality of extracted view sequences, wherein image data for said 2D output image stream is generated utilizing view information derived from said base sequence and at least one other sequence corresponding to the other of said left view sequence or said right view sequence of said plurality of extracted view sequences, such that:
when said base sequence corresponds to said left view sequence, said at least one other sequence corresponds to said right view sequence; and
when said base sequence corresponds to said right view sequence, said at least one other sequence corresponds to said left view sequence;
wherein said one or more circuits, one or more processors, or combination thereof are operable to generate said 2D output image stream by:
selecting one of said left view sequence or said right view sequence as the base sequence for generating said 2D image stream; and
enhancing at least one of a contrast or a sharpness of said one of said left view sequence or said right view sequence selected as said base sequence using the other of said left view sequence or said right view sequence not selected as said base view sequence.

12. The system according to claim 11, wherein said plurality of extracted view sequences comprises of stereoscopic left and right reference fields or frames.

13. The system according to claim 11, wherein said view information utilized during said generation of said image data for said 2D output image stream comprises foreground information, background information, or both.

14. The system according to claim 11, wherein said one or more circuits, one or more processors, or combination thereof are operable to classify regions of frames of said plurality of extracted view sequences as a foreground region or a background region based at least in part on said view information.

15. The system according to claim 14, wherein said one or more circuits, one or more processors, or combination thereof are operable to modify said base sequence for said generated 2D output image stream based at least in part on said region classifications.

16. The system according to claim 15, wherein modifying said base sequence based at least in part on said region classifications enhances contrast, sharpness, or both of images in said 2D output image stream.

17. The system according to claim 11, wherein said one or more circuits, one or more processors, or combination thereof are operable to perform frame rate upconversion operations on said 2D output image stream using frame or field interpolation based upon view information derived from said base sequence and said at least one other sequence.

18. The system according to claim 17, wherein said one or more circuits, one or more processors, or combination thereof are operable to modify said interpolation based on view information derived from said at least one other sequence of said plurality of extracted view sequences.

19. The system according to claim 11, wherein said one or more circuits, one or more processors, or combination thereof are operable to locally perform graphic processing corresponding to include a graphic object in a plurality of images of said 2D output image stream.

20. The system according to claim 19, wherein said one or more circuits, one or more processors, or combination thereof are operable to perform said local graphics processing based on one or more points of focus within each image said plurality of images in said 2D output image stream.

21. A method for video processing, the method comprising: performing by one or more processors, one or more circuits, or any combination thereof in a video processing system:
extracting a plurality of view sequences from a compressed three-dimension (3D) input video stream, the plurality of view sequences comprising a left view sequence and a right view sequence;
generating a two dimensional (2D) output video stream based on a first view content derived from one of said left view sequence or said right view sequence;
enhancing at least one of a contrast or a sharpness of the 2D output video by utilizing a second view content derived from the other of said left view sequence or said right view sequence, such that:
when said first view content is derived from said left view sequence, said second view content is derived from said right view sequence; and
when said first view content is derived from said right view sequence, said second view content is derived from said left view sequence.

* * * * *